(12) United States Patent
Watanabe

(10) Patent No.: US 6,285,016 B1
(45) Date of Patent: Sep. 4, 2001

(54) SCANNING CIRCUIT FOR SOLID-STATE IMAGING DEVICE

(75) Inventor: Takashi Watanabe, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/398,413

(22) Filed: Sep. 16, 1999

(30) Foreign Application Priority Data

Sep. 16, 1988 (JP) .................................................. 10-262114

(51) Int. Cl.$^7$ ....................................................... H01J 40/14
(52) U.S. Cl. ........................ 250/208.1; 257/291; 348/294
(58) Field of Search ........................ 250/208.1; 257/291, 257/448; 348/294, 305, 308, 311

(56) References Cited

U.S. PATENT DOCUMENTS 5,122,649 * 6/1992 Murayama et al. .............. 250/208.1
5,719,626 * 2/1998 Yonoyama et al. ................... 348/301
5,867,212 * 2/1999 Toma et al. ........................... 348/311

OTHER PUBLICATIONS

"A 4M–Pixel CMD Image Sensor", S. Hosokai, et al. *ITE Technical Report*, vol. 21, No. 21, pp. 37–42.

* cited by examiner

Primary Examiner—Stephone B. Allen
(74) Attorney, Agent, or Firm—Dike, Bronstein, Roberts & Cushman/Edwards & Angell; David G. Conlin

(57) ABSTRACT

A scanning circuit for a solid-state imaging device of the present invention includes a shift register divided into a first stage to an N-th stage, each of the first stage to the N-th stage receiving a first pulse signal which is cyclic and has a plurality of pulses and a second pulse signal which is cyclic and has a plurality of pulses, the first stage receiving an input signal, and an invalid transfer pulse or an effective transfer pulse being output from the first stage to the N-th stage, wherein whether or not the transfer pulse is effective or invalid is determined based on the first pulse signal and the input signal, and the N is an integer of 2 or more.

9 Claims, 14 Drawing Sheets

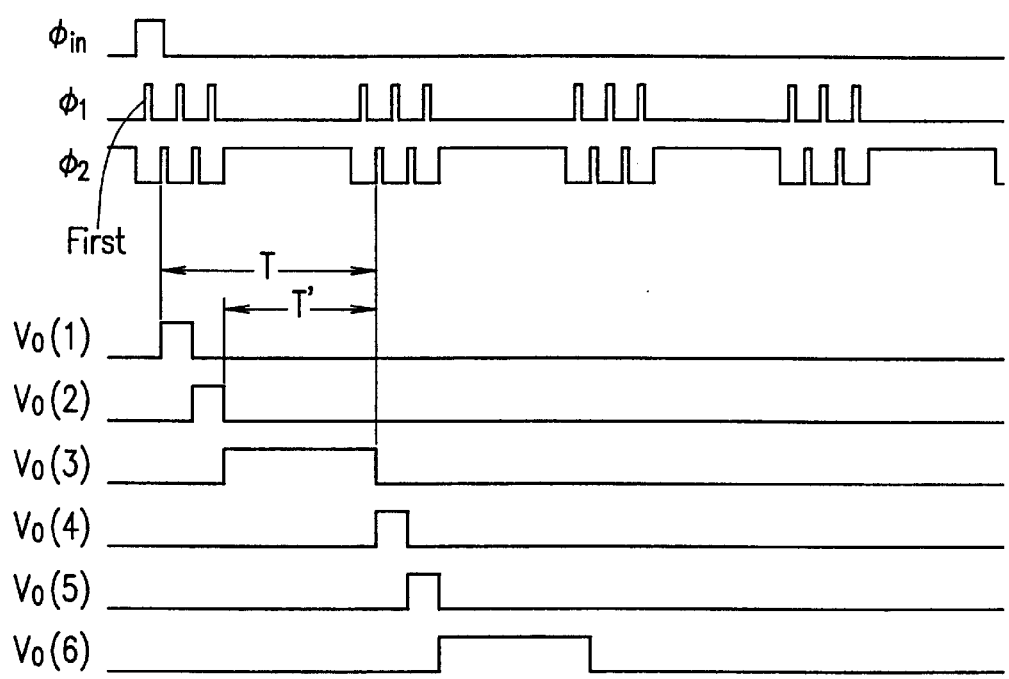

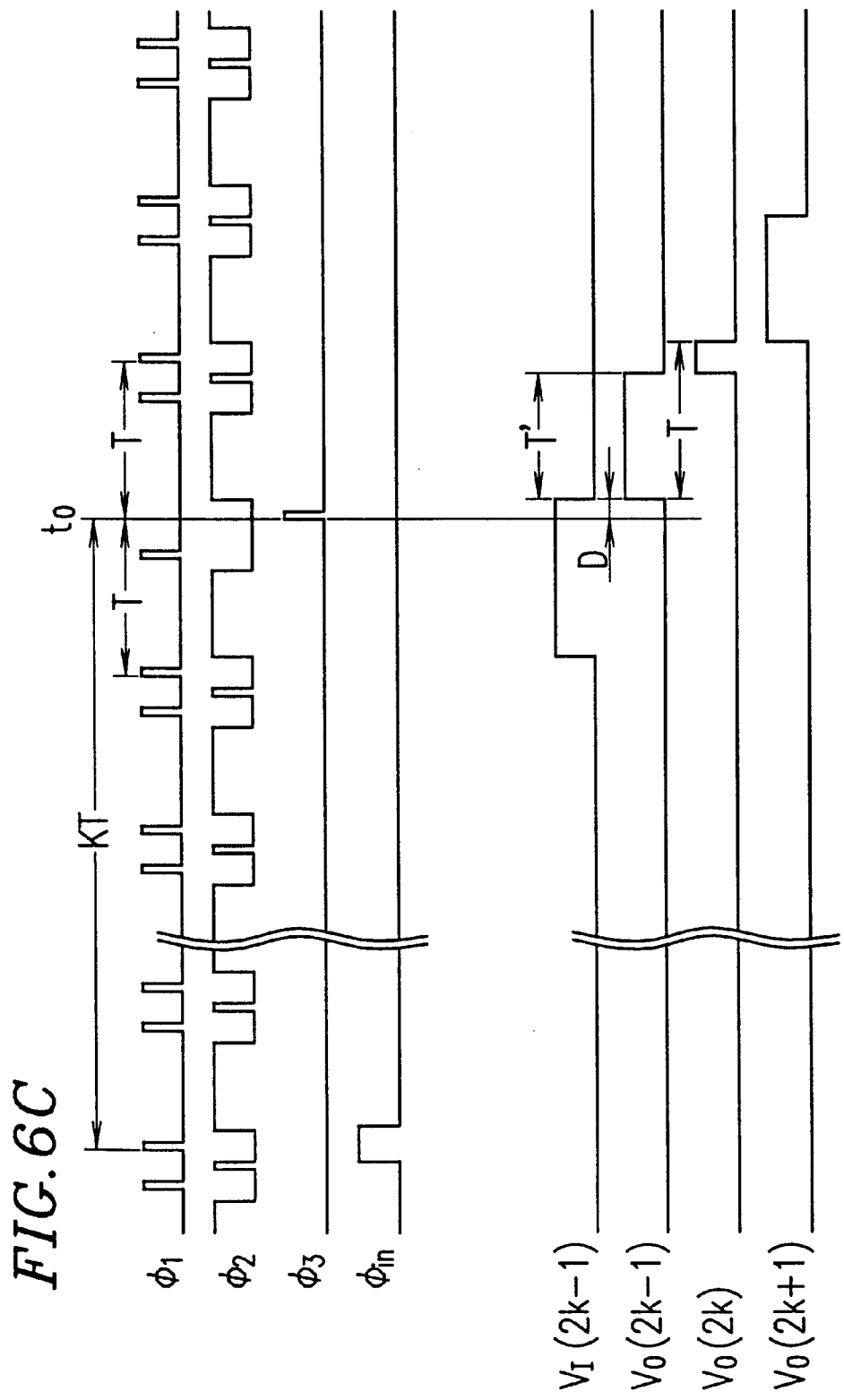

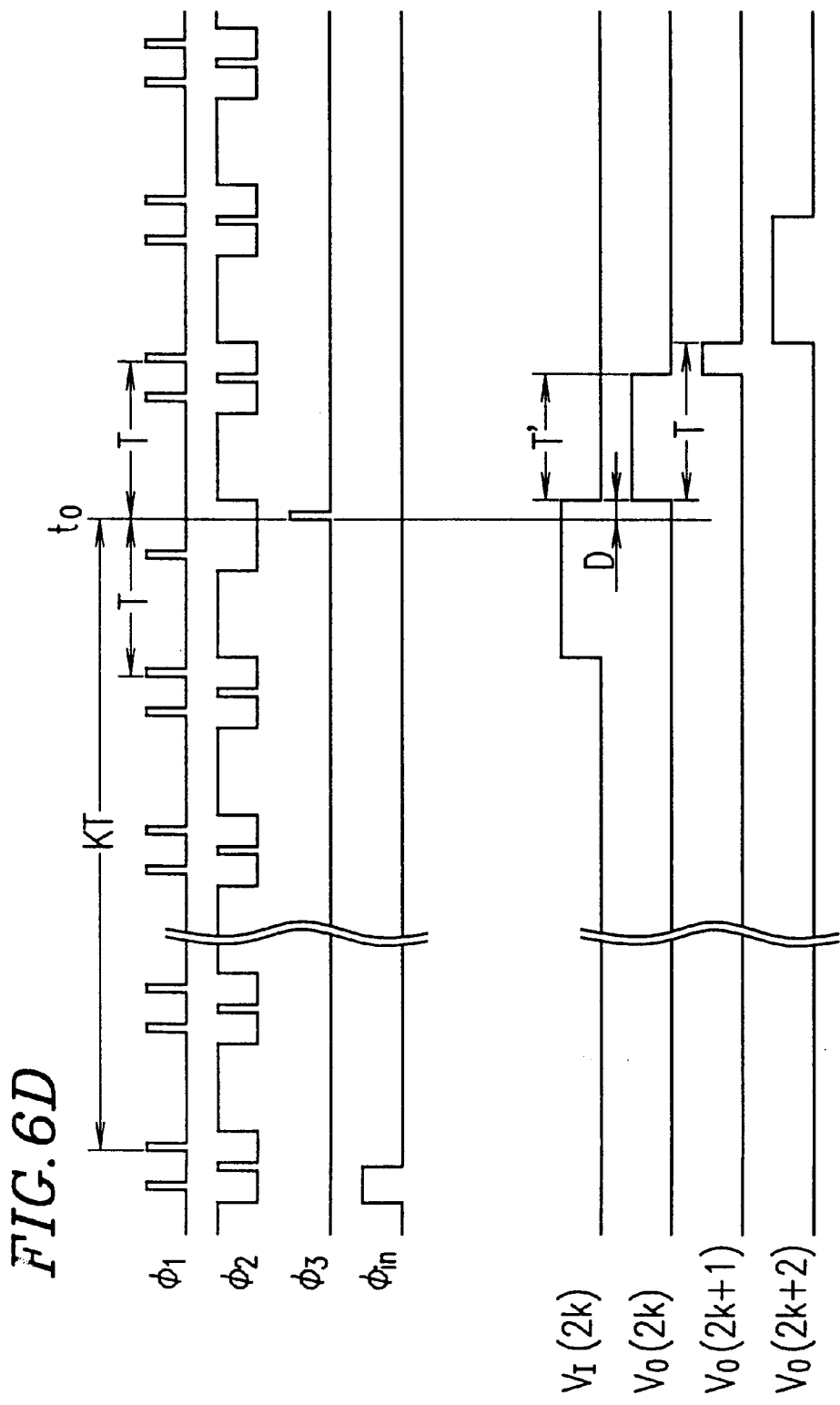

SCANNING CIRCUIT FOR SOLID-STATE IMAGING DEVICE

BACKGROUND OF THE INVENTION

1. Field of the Invention

The present invention relates to a solid-state imaging device. In particular, the present invention relates to a read circuit realizing various read modes such as a block mode (partial read from a specified portion) and a skip mode including interlacing.

2. Description of the Related Art

Conventionally, MOS-type or amplifier-type solid-state imaging devices have been known, in which a signal charge generated from each pixel is read by a read circuit or a signal charge generated by each pixel is converted and amplified to a voltage or current signal in the pixel, and read by the read circuit. In these solid-state imaging devices, by appropriately constructing a read circuit, various read modes such as a block mode (partial read from a specified portion) and a skip mode including interlacing can be performed.

In order to realize various read modes, a decoder is generally used. More specifically, assuming that the total number of drive lines required in a read circuit is m, a B-bit decoder circuit ($2^B \geq m$) is used to independently control each drive line, thereby realizing an arbitrary read operation.

However, the drive operation using a decoder has the following problems.

First, according to the drive operation using a decoder, a decoder itself and a B-bit output logic circuit which drives the decoder are required, and the logic circuit is required to generate control signals which are different in accordance with various drive operation modes. Therefore, a large chip area is occupied, increasing power consumption.

Furthermore, according to the drive using a decoder, a circuit does not become equivalent when seen from each drive line. Thus, streak-shaped fixed pattern noise likely occurs.

In order to solve the above-mentioned problems, a scanning circuit for a solid-state imaging device having a special structure as shown in FIGS. 8 and 9 has been proposed (Hosokai et al., "A 4M-Pixel CMD Image Sensor", Technical Report of the Society of Imaging Information Media IPU' 97–15, Mar. 14, 1997). FIG. 9 shows a specific structure of a clocked inverter which is schematically shown in FIG. 8. More specifically, FIG. 9 shows a structure in which CMOS switches are inserted in series in a CMOS inverter circuit.

Among CMOS shift register portions shown in FIG. 8, a portion (I) is driven with a first control signal CK1, a portion (II) is driven with a second control signal CK2, a portion (III) is driven with a third control signal CK3, and a portion (IV) is driven with a fourth control signal CK4.

In the case where only a CMOS shift register portion is composed of the portions (I) and (II), i.e., in the case where lines are successively scanned, a shift pulse is applied to all of the drive lines.

In the case where only a CMOS shift register portion is composed of the portions (I) and (III), i.e., in the case where a ½ skip mode is conducted, a shift pulse is successively applied to every other drive line. By controlling a line to which an input signal is input, odd-number lines or even-number lines can be selected, and interlacing can be realized.

In the case where only a CMOS shift register portion is composed of the portions (I) and (IV), i.e., in the case where a ¼ skip mode is conducted, a shift pulse is successively applied to one line per four drive lines. By controlling a line to which an input signal is input, any of the first, second, third, and fourth lines can be selected from four drive lines.

The scanning circuit for a solid-state imaging device shown in FIG. 8 is provided with a portion (V) for partial reading from a specified portion. Memories M are connected to the shift register via control switches which are opened or closed with a signal CS. The memories M are used for memorizing an electric potential.

Hereinafter, an operation of reading a signal from a specified portion in the CMOS shift register portion will be described. A signal to be read is, for example, a signal related to image information.

First, a write operation for setting a read starting position is performed in a memory M. More specifically, all of the control switches are turned off with the signal CS. Under this condition, the first control signal CK1 and the second control signal CK2 are applied to the shift register portion, and a start pulse is transferred in the clocked inverter. When the start pulse reaches a read position of interest, an electric potential at a low level is recorded in a memory M corresponding to the read position of interest by turning on all of the control switches with the signal CS.

Next, an operation of reading a signal from a specified portion in the CMOS shift register portion is performed. More specifically, all of the control signals are turned on with the signal CS under the condition of the application of the first control signal CK1 and the second control signal CK2. Thus, information of an electric potential is transferred in the shift register from the memory M corresponding to the read position of interest, and a shift pulse is successively output from the read position.

However, the method illustrated in FIG. 8 has the following problems.

First, when partial read is performed from a specified portion in the scanning circuit for a solid-state imaging device in FIG. 8, an operation including two steps: a write operation and a read operation is required. Therefore, in the case of changing a read position successively, an operation is performed only on a 2-frame (write frame and read frame) basis. In other words, a read position cannot be changed successively on a one frame basis.

Furthermore, a skip rate for a skip mode is fixed depending upon a circuit, and hence, cannot be arbitrarily selected. Therefore, it is required to provide circuit portions corresponding to the respective skip rates, such as the portion (III) for a ½ skip mode and the portion (IV) for a ¼ skip mode. As the skip rate is set more variously, the circuit scale is increased.

Furthermore, in the scanning circuit for a solid-state imaging device shown in FIG. 8, a different circuit element such as a memory is required to be added to a simple CMOS shift register, which complicates a circuit.

SUMMARY OF THE INVENTION

A scanning circuit for a solid-state imaging device of the present invention, includes: a first shift register divided into a first stage to an N-th stage, each of the first stage to the N-th stage having an input terminal and an output terminal, and the input terminal of the first stage receiving an input signal a first period before a predetermined time; a switch group divided into a first stage to an N-th stage, each of the first stage to the N-th stage of the switch group having an input terminal and an output terminal, each of the input terminals of the first stage to the N-th stage of the switch group being connected to each of the output terminals of the first stage to the N-th stage of the first shift register, and each of the first stage to the N-th stage of the switch group being conducted between the input terminal and the output terminal of the switch group based on a pulse signal which becomes active at the predetermined time; and a second shift register divided into a first stage to an N-th stage, each of the first stage to the N-th stage having an input terminal and an output terminal, and each of the input terminals of the first stage to the N-th stage of the second shift register being connected to each of the output terminals of the first stage to the N-th stage of the switch group, wherein the output terminal of the first stage of the second shift register outputs a transfer pulse after an elapse of a second period from the predetermined time, and the N is an integer of 2 or more.

In one embodiment of the present invention, the output terminals of the first stage to the (N−1)-th stage of the first shift register are connected to the input terminals of the second stage to the N-th stage of the first shift register, and each stage of the output terminals of the first stage to the (N−1)-th stage of the second shift register is connected to the input terminals of the second stage to the N-th stage of the second shift register.

In another embodiment of the present invention, each stage of the first shift register has two switches and two inverters, each stage of the switch group has one switch, and each stage of the second shift register has two switches and two inverters.

A scanning circuit for a solid-state imaging device of the present invention, includes a shift register divided into a first stage to an N-th stage, each of the first stage to the N-th stage receiving a first pulse signal which is cyclic and has a plurality of pulses and a second pulse signal which is cyclic and has a plurality of pulses, the first stage receiving an input signal, and an invalid transfer pulse or an effective transfer pulse being output from the first stage to the N-th stage, wherein whether or not the transfer pulse is effective or invalid is determined based on the first pulse signal and the input signal, and the N is an integer of 2 or more.

In one embodiment of the present invention, the output terminals of the first stage to the (N−1)-th stage of the shift register are connected to the input terminals of the second stage to the N-th stage of the shift register.

In another embodiment of the present invention, each stage of the shift register has two switches and two inverters.

A scanning circuit for a solid-state imaging device of the present invention, includes: a first shift register divided into a first stage to an N-th stage, each of the first stage to the N-th stage having an input. terminal and an output terminal, each of the first stage to the N-th stage receiving a first pulse signal which is cyclic except for a vicinity of a predetermined time $t_0$ and has a plurality of pulses and a second pulse signal which is cyclic except for the vicinity of the predetermined time $t_0$ and has a plurality of pulses, and the input terminal of the first stage receiving an input signal a period KT before the predetermined time $t_0$; a switch group divided into a first stage to an N-th stage, each of the first stage to the N-th stage having an input terminal and an output terminal, the input terminals of the first stage to the N-th stage of the switch group being connected to the output terminals of the first stage to the N-the stage of the first shift register, and each of the first stage to the N-th stage of the switch group being conducted between the input terminal and the output terminal of the switch group based on a pulse signal which becomes active at the predetermined time $t_0$; and a second shift register divided into a first stage to an N-th stage, each of the first stage to the n-th stage having an input terminal and an output terminal, each of the first stage to the N-th stage receiving the first pulse signal and the second pulse signal, and the input terminals of the first stage to the N-th stage of the second shift register being connected to the output terminals of the first stage to the N-th stage of the switch group, wherein the output terminal of from an (M·K−(M−1))-th stage to an (M·K−1)-th stage of the second shift register outputs an invalid transfer pulse after an elapse of a period D from the predetermined time $t_0$, and thereafter, the output terminal of an M·K-th stage of the second shift register outputs an effective transfer pulse, the T is a positive number, the M and K are natural numbers, the D is a positive number, the N is a natural number of 2 or more, and the M and K satisfy $1 \leq M \cdot K \leq N$.

In one embodiment of the present invention, the output terminals of the first stage to the (N−1)-th stage of the first shift register are connected to the input terminals of the second stage to the N-th stage of the first shift register, and the output terminals of the first stage to the (N−1)-th stage of the second shift register are connected to the input terminals of the second stage to the N-th stage of the second shift register.

In another embodiment of the present invention, each stage of the first shift register has two switches and two inverters, each stage of the switch group has one switch, and each stage of the second shift register has two switches and two inverters.

Thus, the invention described herein makes possible the advantage of providing a read circuit which is composed of only a simple CMOS shift register, and realizes various read modes such as a block mode (read from a specified portion) and a skip mode at any skip rate including interlacing.

This and other advantages of the present invention will become apparent to those skilled in the art upon reading and understanding the following detailed description with reference to the accompanying figures.

BRIEF DESCRIPTION OF THE DRAWINGS

FIG. 5C is a timing diagram showing the third embodiment of a scanning circuit for a solid-state imaging device according to the present invention.

FIG. 6C is a timing diagram showing the fourth embodiment of a scanning circuit for a solid-state imaging device according to the present invention.

FIG. 6D is a timing diagram showing the fourth embodiment of a scanning circuit for a solid-state imaging device according to the present invention.

DESCRIPTION OF THE PREFERRED EMBODIMENTS

Hereinafter, the present invention will be described by way of embodiments with reference to the drawings.

Embodiment 1

Figure 1:
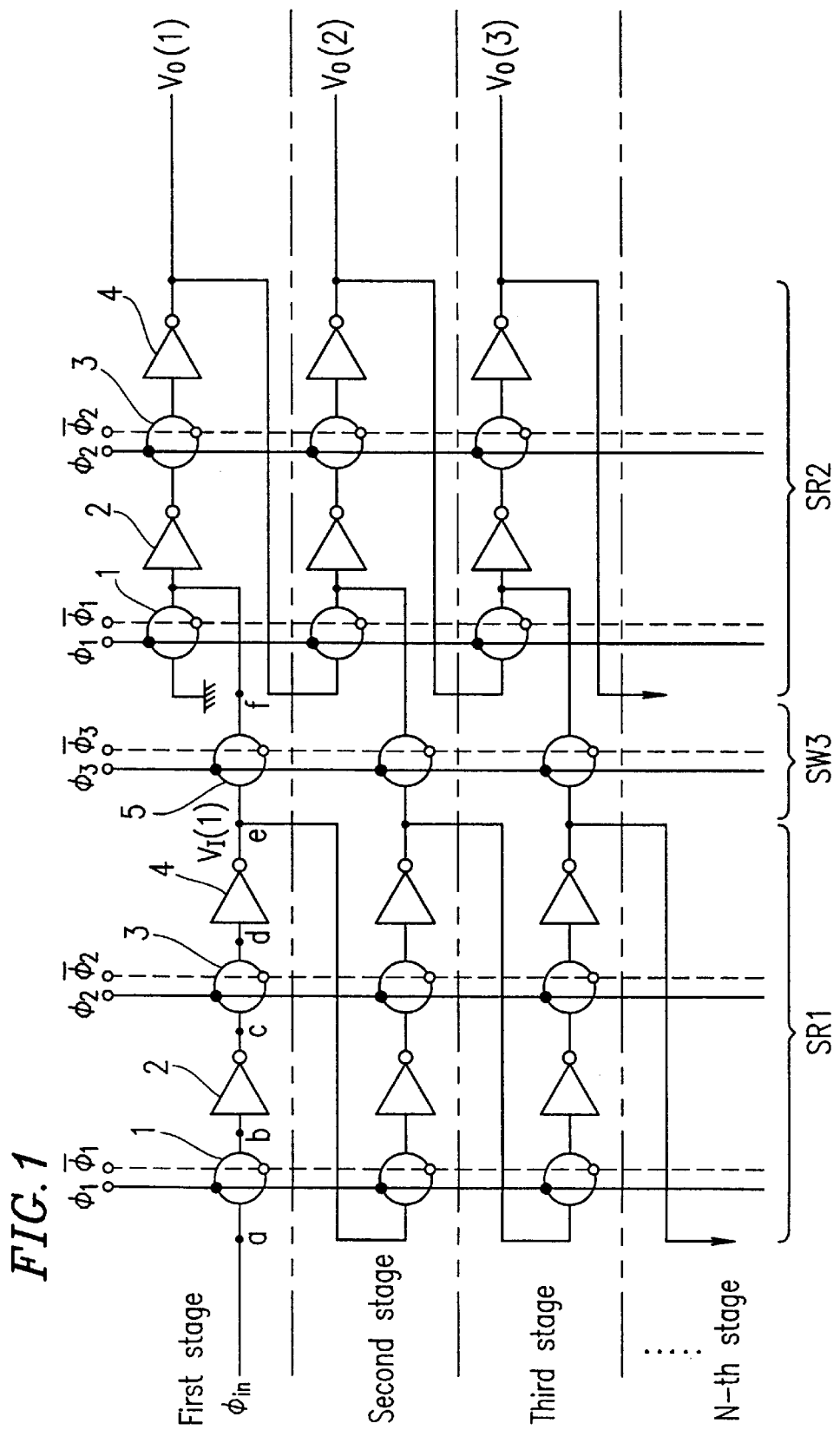
FIG. 1 is a circuit diagram showing the first embodiment of a scanning circuit for a solid-state imaging device according to the present invention.

FIG. 1 shows one embodiment of a scanning circuit for a solid-state imaging device according to the present invention.

Figure 8:
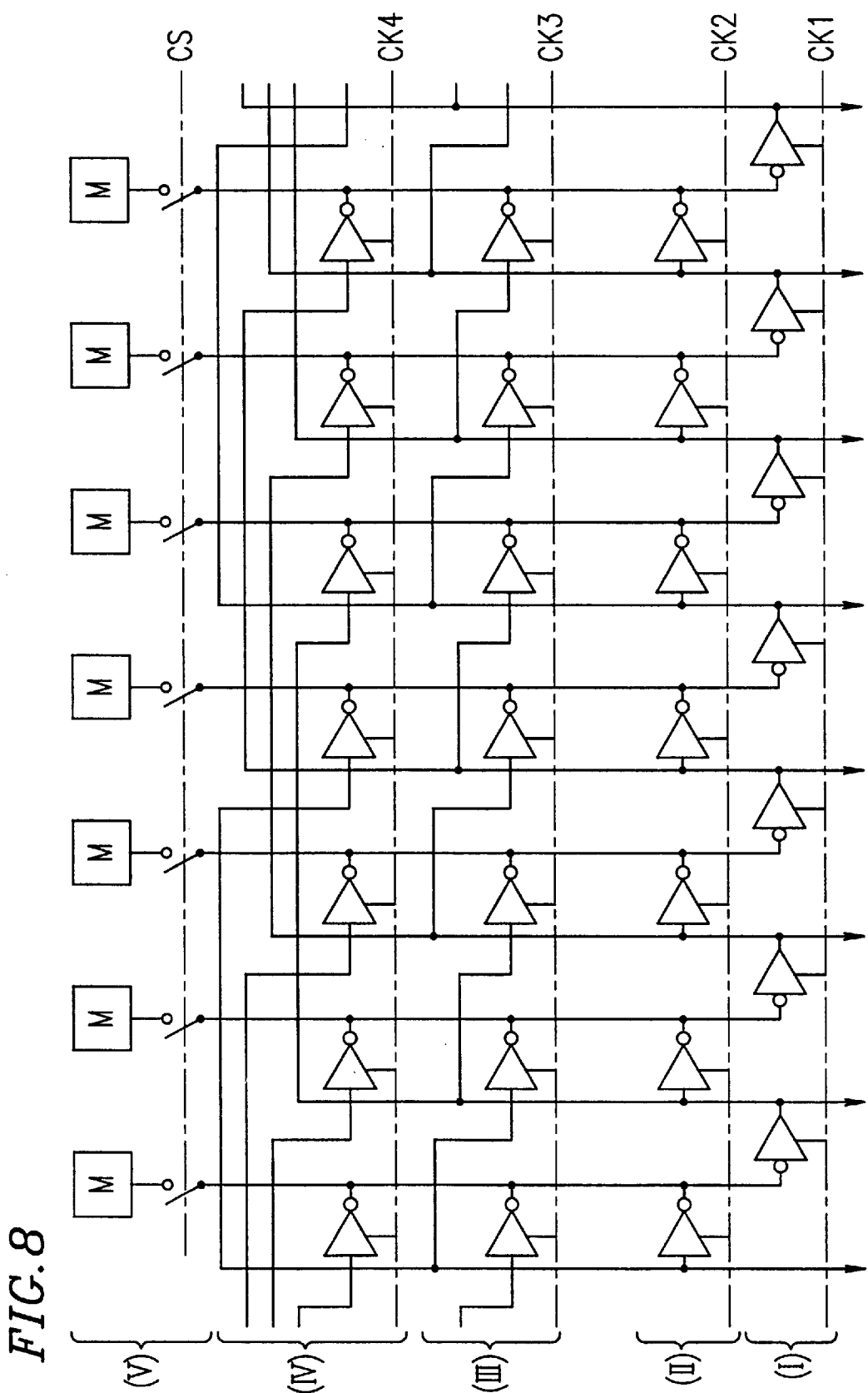
FIG. 8 is a circuit diagram showing an example of a conventional scanning circuit for a solid-state imaging device.
Figure 9:
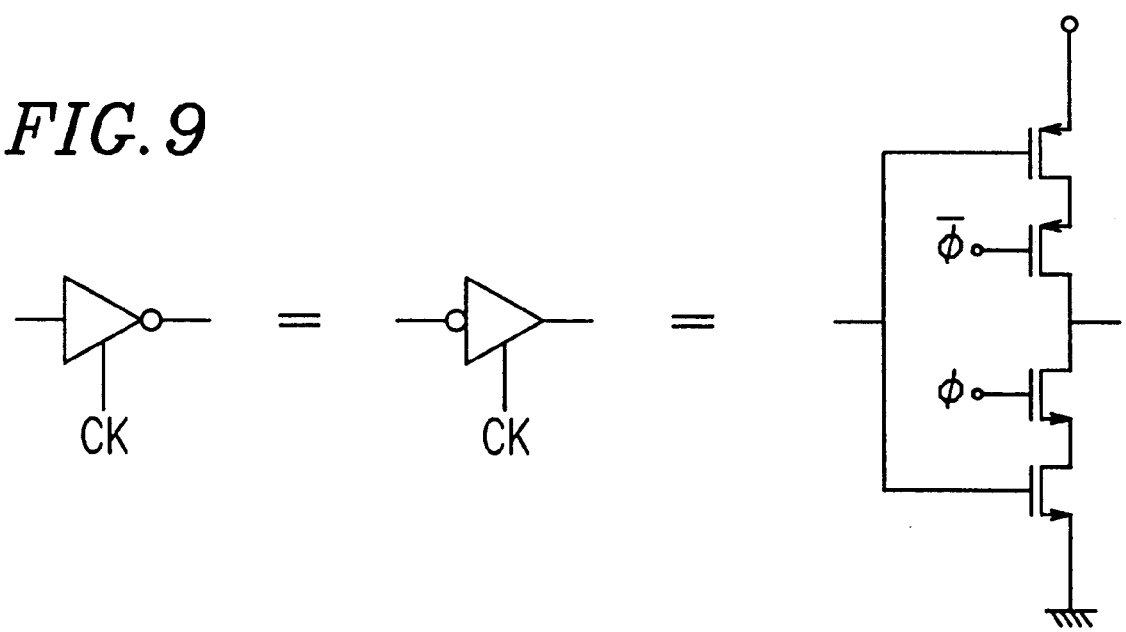
FIG. 9 is a view illustrating components shown in FIG. 8.

The scanning circuit for a solid-state imaging device according to the present invention includes shift registers SR1 and SR2, and a switch group SW3. The shift register SR1 is a known CMOS shift register. The shift register SR1 is functionally identical with the portions (I) and (II) in FIG. 8 using a clocked inverter. The shift register SR2 has the same structure as that of the shift register SR1. The shift register SR1 receives an input signal $\phi_{in}$.

The shift register SR1 is divided into a first stage to an N-th stage, each of the first stage to the N-th stage having an input terminal and an output terminal, and the input terminal of the first stage receives an input signal $\phi_{in}$ a first period T before a predetermined time $t_0$. The output terminals of the first stage to the (N−1)-th stage of the shift register SR1 are connected to the input terminals of the second stage to the N-th stage of the shift register SR1.

The switch group SW3 is divided into a first stage to an N-th stage. Each of the first stage to the N-th stage of the switch group SW3 has an input terminal and an output terminal. Each of the output terminals of the first stage to the N-th stage of the switch group SW3 is connected to each of the output terminals of the first stage to the N-th stage of the shift register SW1. Each of the first stage to the N-th stage of the switch group SW3 is conducted between the input terminal and the output terminal of the switch group SW3 based on a pulse signal $\phi_3$ which becomes active at the predetermined time $t_0$.

The shift register SR2 is divided into a first stage to an N-th stage. Each of the first stage to the N-th stage has an input terminal and an output terminal, and each of the input terminals of the first stage to the N-th stage of the shift register SR2 is connected to each of the output terminals of the first stage to the N-th stage of the switch group SW3. Each stage of the output terminals of the first stage to the (N−1)-th stage of the second shift register is connected to the input terminals of the second stage to the N-th stage of the shift register SR2.

The output terminal of the first stage of the shift register SR2 outputs a transfer pulse after an elapse of a second period from the predetermined time $t_0$, and the N is an integer of 2 or more.

Figure 2A:
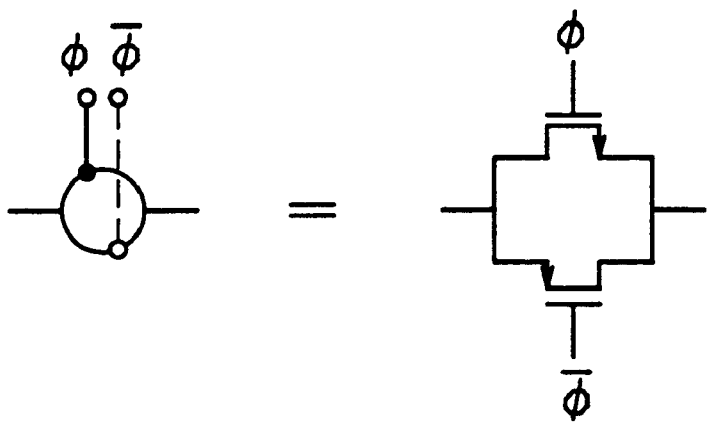
FIGS. 2A to 2C are views illustrating circuit components schematically shown in FIG. 1.
Figure 2B:
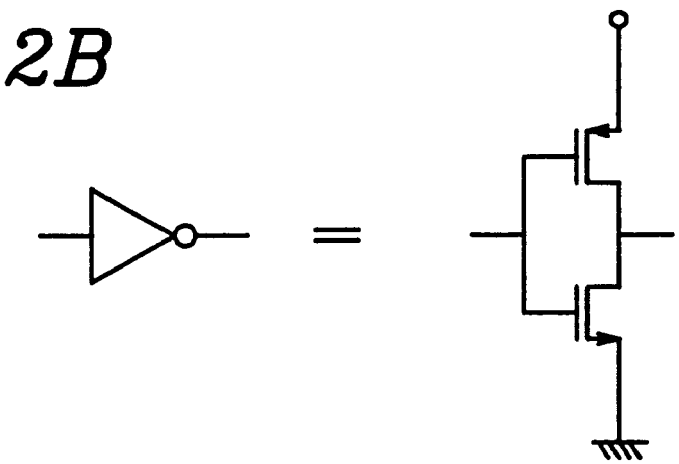
Figure 2C:
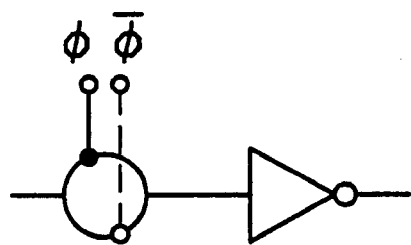

FIGS. 2A to 2C show specific structures of CMOS switches 1, 3, and 5, and CMOS inverters 2 and 4 which are schematically shown in FIG. 1. As shown in FIG. 2A, a switch used in the present invention allows a signal to pass therethrough in the case where a control signal $\phi$ is high and a control signal $/\phi$ is low, and does not allow a signal to pass therethrough in the case where the control signal $\phi$ is low and the control signal $/\phi$ is high. Herein, "$/\phi$" denotes an inverted signal of the control signal $\phi$. Furthermore, once a signal passes through the switch, the level of the signal is retained even when the switch is turned off. As shown in FIG. 2B, an inverter used in the present invention has a function of inverting an input signal and outputting it. A component of a shift register shown in FIG. 2C is composed of the switch shown in FIG. 2A and the inverter shown in FIG. 2B.

Referring to FIG. 1, one transfer stage of each of the shift registers SR1 and SR2 includes a first switch 1, a first inverter 2, a second switch 3, and a second inverter 4. The first switch 1 and the second switch 3 are respectively driven by a first control signal $\phi_1$ (e.g., clock pulse signal) and a second control signal $\phi_2$ (e.g., clock pulse signal). Herein, the control signal has a plurality of pulses in a time domain.

In the scanning circuit shown in FIG. 1, a third switch 5 included in the switch group SW3 is disposed around the second inverters 4 of the shift register SR1. Furthermore, each input to the switch group SW3 is connected to each separately provided output of the shift register SR1. The third switch 5 is driven by a third control signal $\phi_3$ (e.g., clock pulse signal).

There is a parasitic capacitance between an input gate of an inverter and ground. Therefore, in a shift register which includes a switch and an inverter, the switch can be considered to be a sample-and-hold circuit whose capacitance is the parasitic capacitance (a load capacitance). According to the present invention, paying attention to this point, it is assumed that a plurality of sample-and-hold circuits are connected in parallel with a common load capacitance, and an input timing and a hold timing of a signal are adjusted. Accordingly, a desired read operation is obtained. This enables a plurality of output signals to be combined in a shift register, whereby various functions as described below can be realized.

An operation of the scanning circuit for a solid-state imaging device (FIG. 1) will be described with reference to FIGS. 3A and 3B.

Figure 3A:
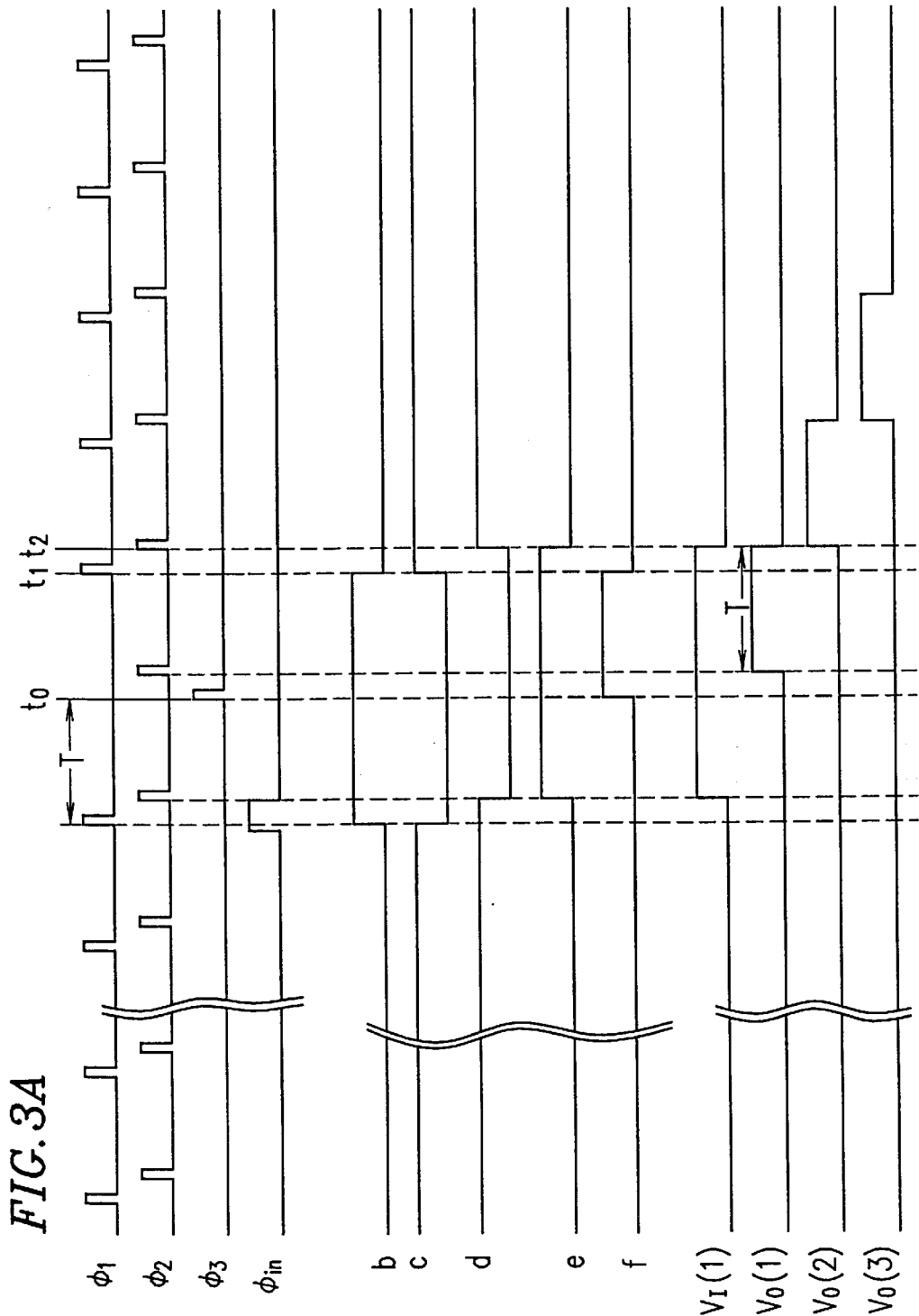
FIG. 3A is a timing diagram illustrating the operation of the scanning circuit shown in FIG. 1.

FIG. 3A shows the case where an input pulse $\phi_{in}$ is applied to an input side of the shift register SR1 (FIG. 1) a period T before a starting time $t_0$. Herein, the control signals $\phi_1$ and $\phi_2$ have a cycle of T and do not overlap each other. However, the control signal $\phi_1$ does not have a pulse at the starting time $t_0$, and instead, the pulse of the control signal $\phi_3$ is present at the starting time $t_0$.

In the shift register SR1 (FIG. 1), one bit is transferred per stage as follows. More specifically, the input signal $\phi_{in}$ input at a time $(t_0-T)$ is sampled by the first switch 1 (FIG. 1) in response to the control signal $\phi_1$ which becomes high at substantially the same time. The control signal $\phi_1$ represents a timing at which the first switch 1 of the shift register SR1 samples the input signal $\phi_{in}$. A parasitic capacitance of the first inverter 2 of the shift register SR1 holds the input signal $\phi_{in}$ at a high level until a time $t_1$ at which the first switch 1 samples a low signal (b in FIG. 3A). The signal passed through the first switch 1 is inverted by the first inverter 2 (c in FIG. 3A). The signal is sampled by the second switch 3 when the control signal $\phi_2$ becomes high, and is held low until a time $t_2$ at which the second switch 3 samples a high signal (d in FIG. 3A). The signal held by a parasitic capacitance of the second inverter 4 of the shift register SR1 is inverted by the second inverter 4 in FIG. 1 (e in FIG. 3A). As described above, the control signal $\phi_1$ does not include a pulse at the time $t_1$, and instead, the pulse of the control signal $\phi_3$ is present at this time. Thus, the signal from the second inverter 4 of the shift register SR1 is sampled by the switch 5, and the signal is held high by a parasitic capacitance of the first inverter 2 of the shift register SR2 until the first switch 1 of the shift register SR2 is turned on by the control signal $\phi_1$ to sample a low signal (f in FIG. 3A). As a result that the input signal $\phi_{in}$ is transmitted, an output signal $V_1(1)$ is obtained at the first stage of the shift register SR1, and an OFF state continues at the other stages.

An output from each stage of the shift register SR1 is supplied to each input of the shift register SR2 via each switch 5 of the switch group SW3. As described above, a signal applied to each input of the shift register SR2 via each switch 5 of the switch group SW3 is the output signal $V_f(1)$, which is output from the first stage of the shift register SR1. As a result, an output signal $V_0(1)$ is output from the shift register SR2, followed by output signals $V_0(2)$ and $V_0(3)$. Although not shown in FIG. 3A, output signals $V_0(4)$, $V_0(5)$ . . . $V_0(N)$ are output. More specifically, continuous read is performed from the leading stage.

Figure 3B:
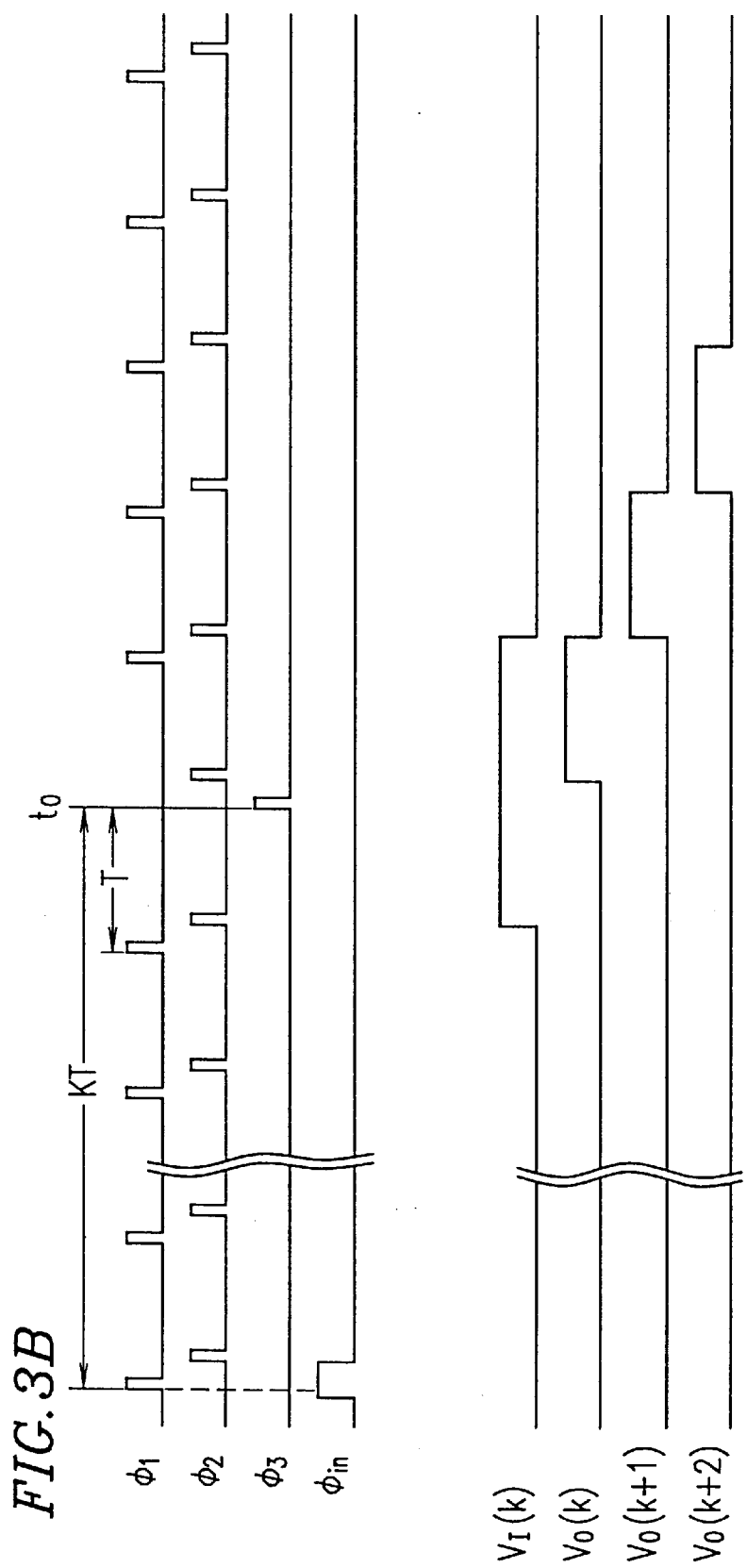
FIG. 3B is a timing diagram illustrating the operation of the scanning circuit shown in FIG. 1.

FIG. 3B shows the case where the input signal $\phi_{in}$ is applied to an input side of the shift register SR1 one period KT before the starting time $t_0$. In the shift register SR1, one bit is transferred per stage. The case shown in FIG. 3B is different from that shown in FIG. 3A in that the input signal transferred to the switch 5 in the first stage is transferred to the second, third, . . . N-th transfer stages without passing through the switch 5. This is because the control signal $\phi_3$ does not become high until the starting time $t_0$. Thus, an output signal $V_f(K)$ is obtained at an output terminal of the N-th stage of the shift register SR1. At the starting time $t_0$, an OFF state continues at an output terminal of the other stages of the shift register. Herein, K is an integer of 1 to N. N is an integer of 2 or more.

An output signal from each stage of the shift register SR1 is applied to each input terminal of the shift register SR2 via each switch 5 of the switch group SW3. As described above, a signal applied to each input terminal of the shift register SR2 via each switch 5 of the switch group SW3 is the output signal $V_f(K)$, which is output from the k-th stage of the shift register SR1. As a result, an output signal $V_0(K)$ is output from the k-th stage of the shift register SR2, followed by output signals $V_0(k+1)$, $V_0(k+2)$, . . . from the (k+1)-th stage, the (k+2)-th stage, . . . of the shift register SR2. More specifically, continuous read is conducted at a stage delayed from the leading stage by k stages.

The value of k can be changed by changing the position (timing) of the input signal $\phi_{in}$. Therefore, a block mode (partial read) can be performed, in which a read position is set at an arbitrary position. Thus, if the present invention is used together with a horizontal scanning circuit and a vertical scanning circuit, a cut-out position of an image can be arbitrarily changed both in a horizontal direction and a vertical direction in an easy manner.

Furthermore, according to the present invention, a read position is set by changing the position of the input signal $\phi_{in}$. Therefore, a read position can be set at a real time, and furthermore, successively changed in a frame period. Thus, continuous panning (continuous movement of a pickup region in a horizontal direction) and tilting (continuous movement of a pickup region in a vertical direction) can be easily realized.

By adopting a dynamic type shift register, power consumption can be reduced.

Embodiment 2

Embodiment 2 of the present invention will be described with reference to FIGS. 4A and 4B.

Figure 4A:
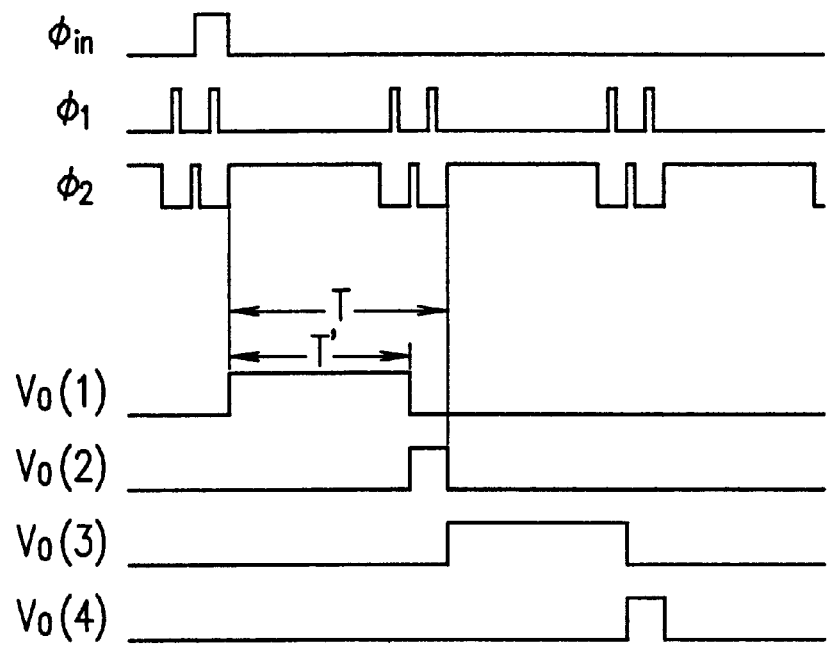
FIG. 4A is a timing diagram showing the second embodiment of a scanning circuit for a solid-state imaging device according to the present invention.
Figure 4B:
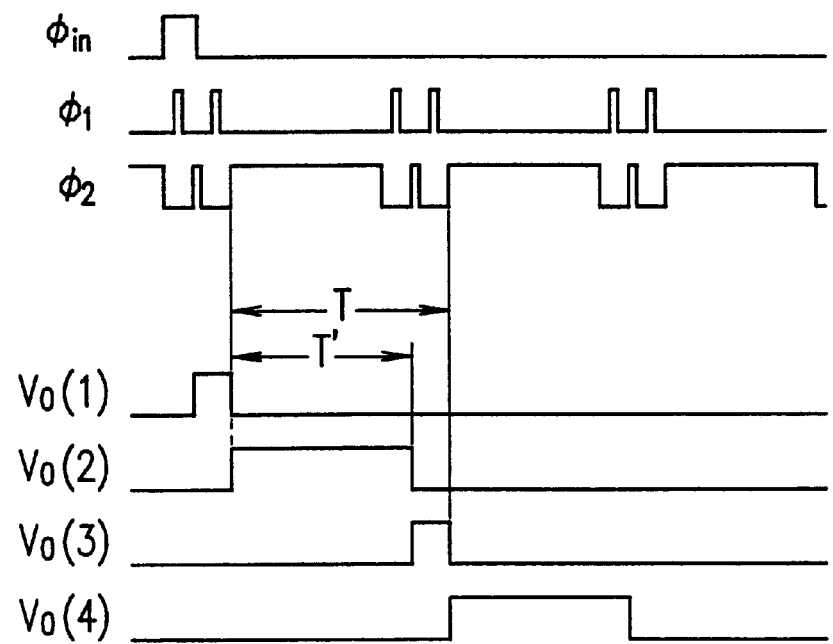
FIG. 4B is a timing diagram showing the second embodiment of a scanning circuit for a solid-state imaging device according to the present invention.

In Embodiment 2, signals, for example, shown in FIGS. 4A and 4B are given to the shift register SR2 and the like shown in FIG. 1.

As shown in FIGS. 4A and 4B, control signals $\phi_1$ and $\phi_2$ respectively include two pulses per period T. In the description below, an input signal $\phi_{in}$ refers to a signal applied to a point f in FIG. 1.

As shown in FIG. 4A, the input signal $\phi_{in}$ is set so as to become high at the same time as the latter pulse of two continuous pulses of the control signal $\phi_1$. Among output signals output from the shift register SR2, only output signals $V_0(1)$, $V_0(3)$, . . . at the odd-number stages become high during a substantially effective period T' which is required on a load (not shown) connected to the shift register SR2. That is, during an invalid period, an output signal cannot activate the load. More specifically, effective pulses are output from every other line at the odd-number stages among drive lines.

As shown in FIG. 4B, the input signal $\phi_{in}$ is overlapped with the former pulse of two continuous pulses of the control signal $\phi_1$. Among output signals output from the shift register SR2, only output signals $V_0(2)$, $V_0(4)$, . . . at the even-number stages become high during the substantially effective period T'. More specifically, effective pulses are output from every other line at the even-number stages among drive lines.

It is appreciated that interlacing can be performed even by combining the timing diagrams shown in FIGS. 4A and 4B.

Figure 5A:
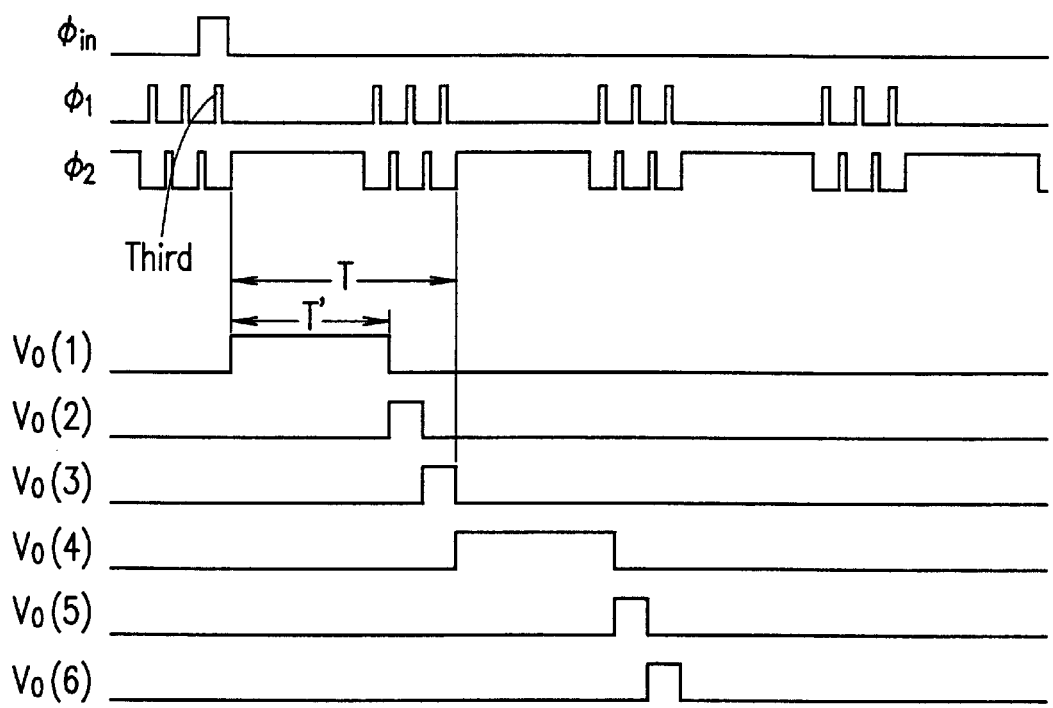
FIG. 5A is a timing diagram showing the third embodiment of a scanning circuit for a solid-state imaging device according to the present invention.
Figure 5B:
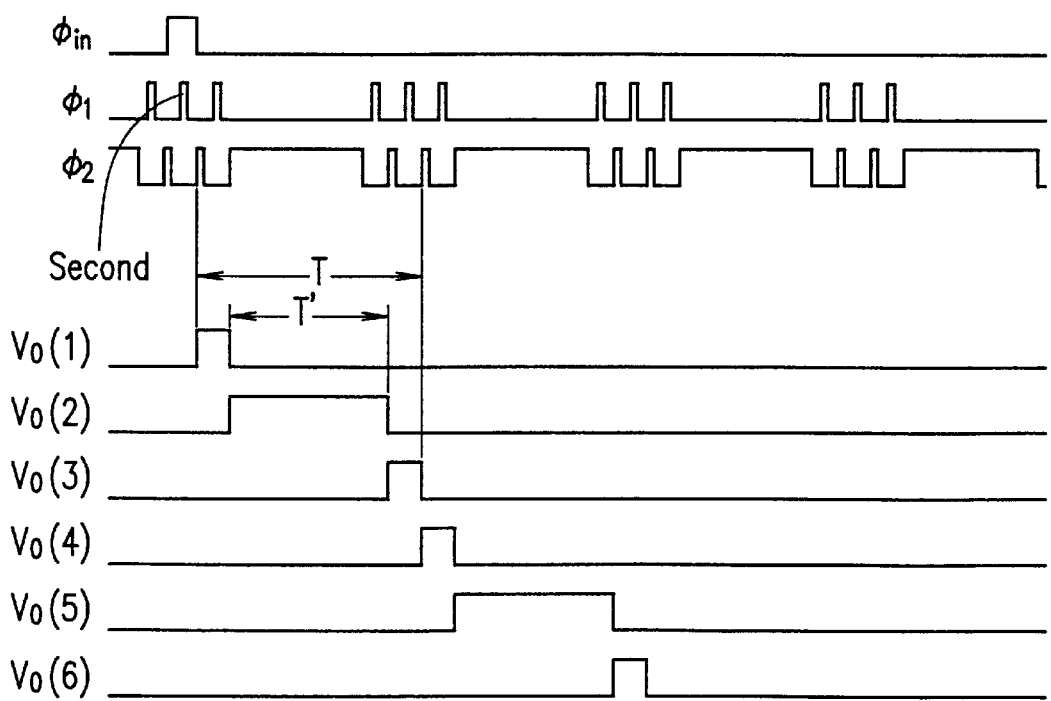
FIG. 5B is a timing diagram showing the third embodiment of a scanning circuit for a solid-state imaging device according to the present invention.

A ½ skip mode has been described with reference to FIGS. 4A and 4B. FIGS. 5A to 5C show a ⅓ skip mode. In FIGS. 5A to 5C, the technique of a ⅓ skip mode is applied to the ordinary shift register SR2 in the same way as in FIGS. 4A and 4B. As shown in FIGS. 5A to 5C, control signals $\phi_1$ and $\phi_2$ respectively include three pulses per period T.

As shown in FIG. 5A, an input signal $\phi_{in}$ is overlapped with the third pulse among three continuous pulses of the control signal $\phi_1$. Among output signals output from the shift register SR2, output signals $V_0(1)$, $V_0(4)$, . . . become high during a substantially effective period T'. Thus, only ⅓ of the drive lines are effective, i.e., only (3p−2)th lines (p is a natural number) are effective.

As shown in FIG. 5B, the input signal $\phi_{in}$ is overlapped with the second pulse among three continuous pulses of the control signal $\phi_1$. Among output signals output from the shift register SR2, only output signals $V_0(2)$, $V_0(5)$, . . . become high during the substantially effective period T'. Thus, only ⅓ of the drive lines are effective, i.e., only (3p−1)th lines (p is a natural number) are effective.

As shown in FIG. 5C, the input signal $\phi_{in}$ is overlapped with the first pulse among three continuous pulses of the control signal $\phi_1$. Among output signals output from the shift register SR2, only output signals $V_0(3)$, $V_0(6)$, . . . become high during the substantially effective period T'. Thus, only ⅓ of the drive lines is effective, i.e., only 3p-th lines (p is a natural number) are effective.

As shown in FIGS. 4A, 4B, and 5A to 5C, according to the present invention, a skip mode at any skip rate can be performed by changing a drive pulse without altering a circuit itself. Furthermore, interlacing can be performed by changing an input pulse.

The case where the above-mentioned ½ skip mode is applied to the scanning circuit in FIG. 1 will be shown with reference to FIGS. 6A to 6D. In FIGS. 6A to 6D, it is assumed that the control signals $\phi_1$ and $\phi_2$ include two pulses per period T excluding the periods T before and after the starting time $t_0$, and the pulses of the control signals $\phi_1$ and $\phi_2$ are not overlapped with each other. In the vicinity of the starting time $t_0$, the control signals $\phi_1$ and $\phi_2$ do not have a pulse. In other words, the control signal $\phi_1$ has one pulse during one of the periods T before and after the starting time $t_0$, the control signal $\phi_2$ has one pulse during one of the periods T before and after the starting time $t_0$, and a control signal $\phi_3$ has one pulse at the starting time $t_0$.

Figure 6A:
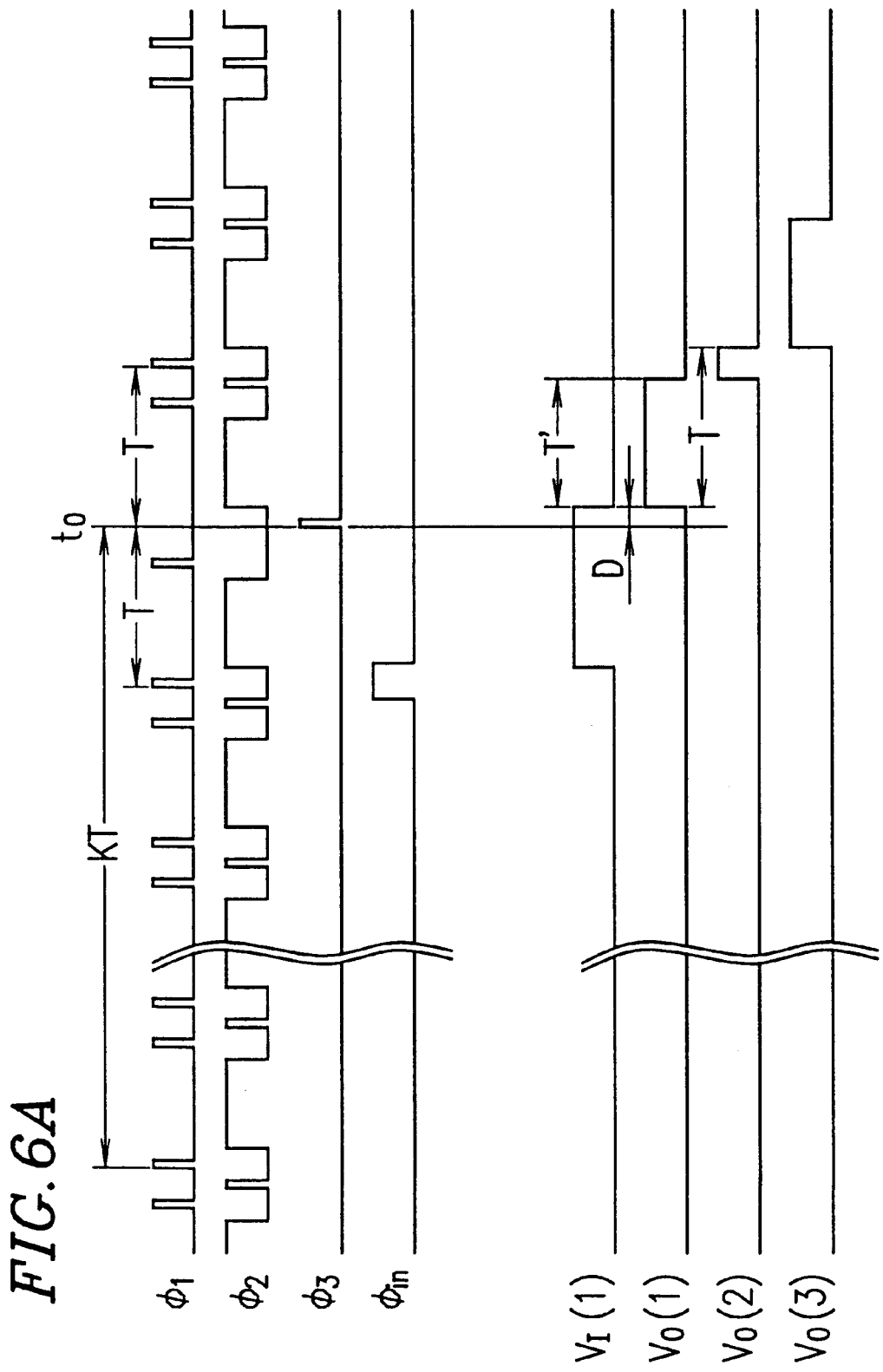
FIG. 6A is a timing diagram showing the fourth embodiment of a scanning circuit for a solid-state imaging device according to the present invention.

First, as shown in FIG. 6A, the input signal $\phi_{in}$ is overlapped with the latter pulse of two continuous pulses of the control signal $\phi_1$ one period T before the starting time $t_0$, and is supplied to an input terminal a of the shift register SR1. In the shift register SR1, one bit is transferred per stage. An output signal $V_f(1)$ is obtained at the first stage of the shift register SR1. An OFF state is kept at the other stages.

An output signal of each stage of the shift register SR1 is applied to each input of the shift register SR2 via each switch 5 of the switch group SW3. As described above, an output signal applied to each input of the shift register SR2 via each switch 5 of the switch group SW3 is the output signal $V_f(1)$ alone, which is output from the first stage of the shift register SR1. As a result, an output signal $V_0(1)$ is output from the shift register SR2, followed by output signals $V_0(2)$, $V_0(3)$, . . . The output signal $V_0(1)$ is output after an elapse of a period D from the starting time $t_0$. D is a positive number.

However, among output signals output from the shift register SR2, only output signals $V_0(1)$, $V_0(3)$, . . . at the odd-number stages become high during a substantially effective period T' which is required on the load connected to the scanning circuit shown in FIG. 1. More specifically, a ½ skip mode is conducted at the odd-number stages, starting from the leading stage.

Figure 6B:
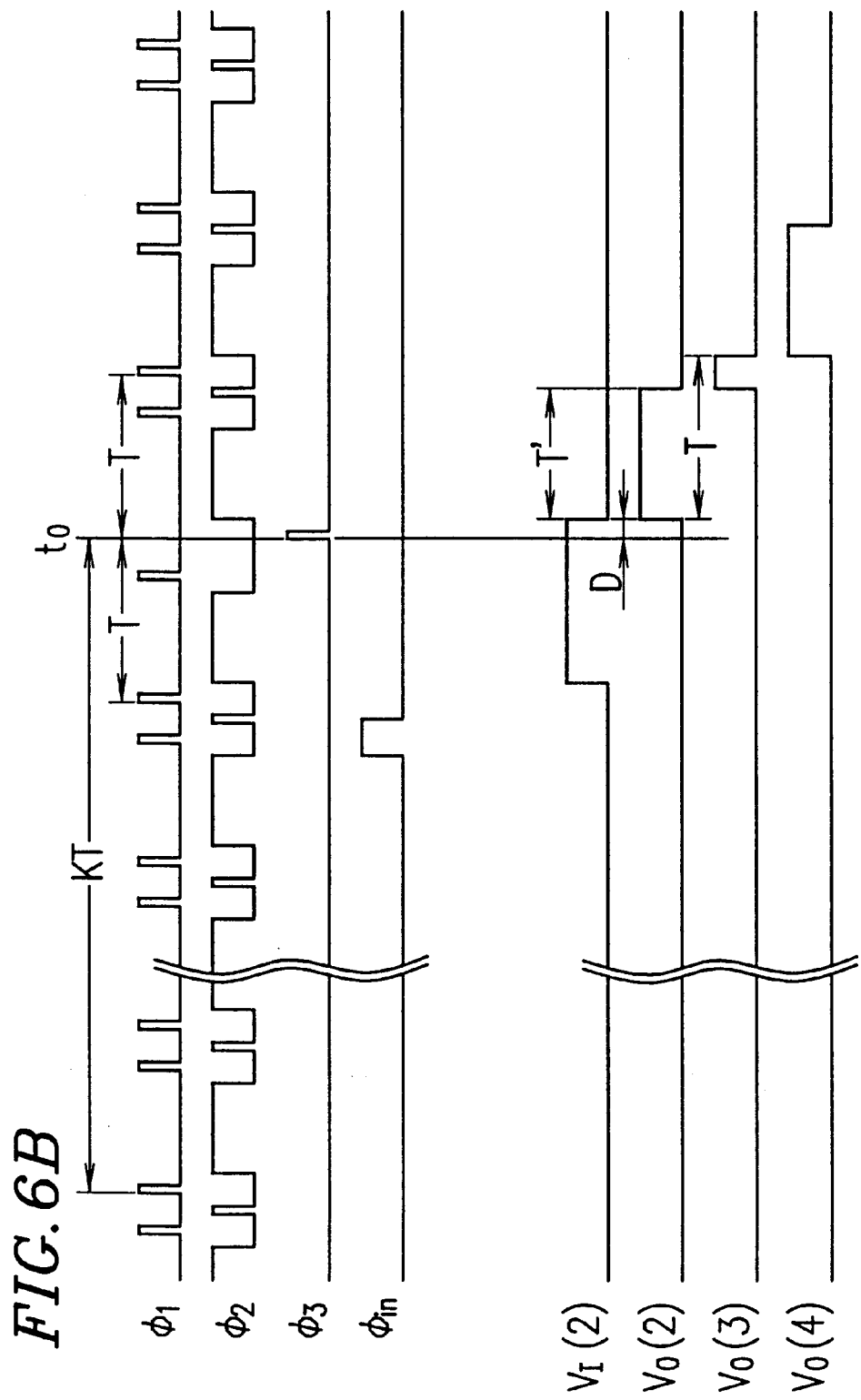
FIG. 6B is a timing diagram showing the fourth embodiment of a scanning circuit for a solid-state imaging device according to the present invention.

Next, as shown in FIG. 6B, the input signal $\phi_{in}$ is overlapped with the former pulse of two continuous pulses of the control signal $\phi_1$ one period T before the starting time $t_0$, and is supplied to the input terminal a of the shift register SR1. In the shift register SR1, one bit is transferred per stage. An output signal $V_f(2)$ is obtained at the second stage of the shift register SR1. An OFF state is kept in the other stages.

An output signal of each stage of the shift register SR1 is applied to each input of the shift register SR2 via each switch 5of the switch group SW3. As described above, an output signal applied to each input of the shift register SR2 via each switch 5 of the switch group SW3 is the output signal $V_f(2)$ alone, which is output from the second stage of the shift register SR1. As a result, an output signal $V_0(2)$ is output from the shift register SR2, followed by output signals $V_0(3)$, $V_0(4)$, . . . However, among output signals output from the shift register SR2, only output signals $V_0(2)$, $V_0(4)$, . . . at the even-number stages become high during a substantially effective period T' which is required on the load connected to the scanning circuit shown in FIG. 1. More specifically, a ½ skip mode is conducted at the even-number stages, starting from the second stage from the leading stage.

Next, as shown in FIG. 6C, the input signal $\phi_{in}$ is overlapped with the latter pulse of two continuous pulses of the control signal $\phi_1$ one period KT before the starting time $t_0$, and is supplied to the input terminal a of the shift register SR1. In the shift register SR1, one bit is transferred per stage. An output signal $V_f(2k-1)$ is obtained at the (2k-1)th stage of the shift register SR1. An OFF state continues in the other stages.

An output signal of each stage of the shift register SR1 is applied to each input of the shift register SR2 via each switch 5 of the switch group SW3. As described above, an output signal applied to each input of the shift register SR2 via each switch 5 of the switch group SW3 is the output signal $V_f(2k-1)$ alone, which is output from the (2k-1)th stage of the shift register SR1. As a result, an output signal $V_0(2k-1)$ is output from the shift register SR2, followed by output signals $V_0(2k)$, $V_0(2k+1)$, . . . However, among output signals output from the shift register SR2, only output signals $V_0(2k-1)$, $V_0(2k+1)$ . . . at the odd-number stages become high during a substantially effective period T' which is required on the load connected to the scanning circuit shown in FIG. 1. More specifically, a ½ skip mode is conducted at the odd-number stages, starting from the (2k-1)th stage from the leading stage.

Next, as shown in FIG. 6D, the input signal $\phi_{in}$ is overlapped with the former pulse of two continuous pulses of the control signal $\phi_1$ one period KT before the starting time $t_0$, and is supplied to the input terminal a of the shift register SR1. In the shift register SR1, one bit is transferred per stage. An output signal $V_f(2k)$ is obtained at the (2k) th stage of the shift register SR1. An OFF state continues in the other stages.

An output of each stage of the shift register SR1 is applied to each input of the shift register SR2 via each switch 5 of the switch group SW3. As described above, an output signal applied to each input of the shift register SR2 via each switch 5 of the switch group SW3 is the output signal $V_f(2k)$ alone, which is output from the (2k) th stage of the shift register SR1. As a result, an output signal $V_0(2k)$ is output from the shift register SR2, followed by output signals $V_0(2k+1)$, $V_0(2k+2)$, . . . However, among output signals output from the shift register SR2, only output signals $V_0(2k)$, $V_0(2k+2)$, . . . at the even-number stages become high during a substantially effective period T' which is required on the load connected to the scanning circuit shown in FIG. 1. More specifically, a ½ skip mode is conducted in the odd-number stages, starting from the (2k)th stage from the leading stage.

The value of k shown in FIGS. 6A to 6D can be changed only by changing the position (timing) of the input signal $\phi_{in}$. Therefore, a block mode (partial read) in which a read position is set at an arbitrary position, and a skip mode can be realized.

The ½ skip mode has been described with reference to FIGS. 6A to 6D. The same description is applicable to other skip modes such as a ⅓ skip mode.

Embodiment 3

Figure 7:
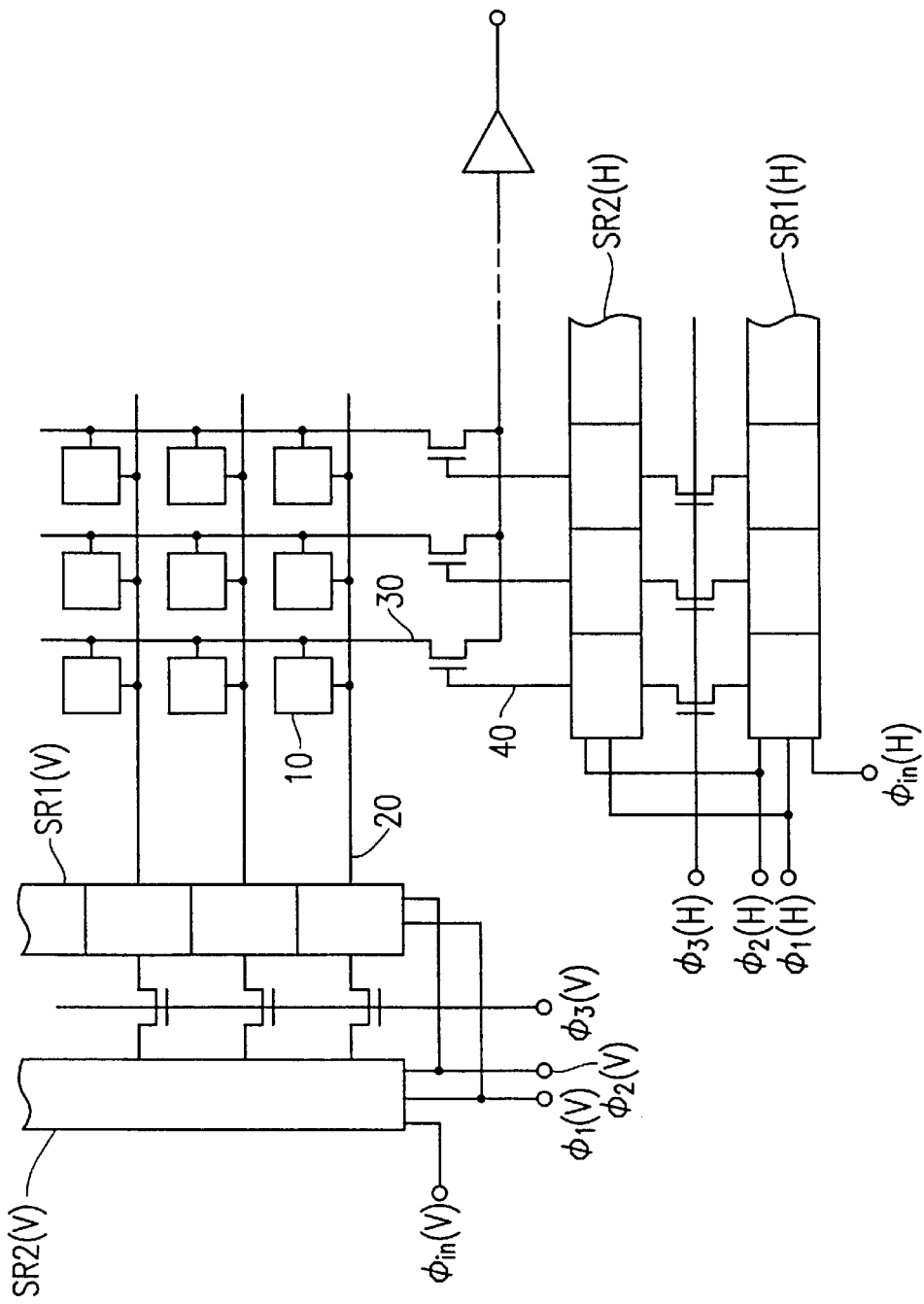
FIG. 7 is a circuit diagram in the case where a scanning circuit for a solid-state imaging device according to the present invention is applied to an area image sensor.

FIG. 7 shows an example in which the present invention shown in FIGS. 1 to 6A to 6D is applied to both a horizontal scanning circuit and a vertical scanning circuit of an area image sensor.

The area image sensor includes pixels 10, vertical selection lines 20, signal lines 30, and horizontal selection lines 40. The area image sensor further includes a vertical scanning circuit which adopts shift registers SR1(V) and SR2(V)

of the present invention and a horizontal scanning circuit which adopts shift registers SR1(H) and SR2(H) of the present invention. The vertical scanning circuit receives control signals $\phi_1(V)$, $\phi_2(V)$, and $\phi_3(V)$, and an input signal $\phi_{in}(V)$. The horizontal scanning circuit receives control signals $\phi_1(H)$, $\phi_2(H)$, and $\phi_3(H)$, and an input signal $\phi_{in}(H)$. Herein, (V) represents a vertical direction, and (H) represents a horizontal direction.

The shift registers included in the vertical scanning circuit and the horizontal scanning circuit can perform the operation described in Embodiments 1 and 2.

Because of the above structure, a cut-out position of an image can be arbitrarily changed both in horizontal and vertical directions. Alternatively, a skip mode at an arbitrary skip rate can be performed. Thus, operations such as electronic panning, tilting, and zooming can be easily realized.

According to the present invention, a read position can be set only by changing the position (timing) of the input pulse $\phi_{in}$. Therefore, a read position can be set at a real time, and can be successively changed in a frame period.

According to the present invention, the scanning circuit is composed of shift registers and switches, which does not require a memory. Thus, an operation on a 2-frame (write frame and read frame) basis is not required.

According to the present invention, depending upon a period from the time when an input signal is applied to the time when a transfer pulse signal for transferring a signal from the first shift register to the second shift register is applied, it is determined from which transfer stage of the second shift register is output. Therefore, if the scanning circuit of the present invention is applied to an imaging device, a read position can be directly altered with an output signal in a successive manner, by changing the time at which an input signal is input. That is, an image can easily be read from some region in a vertical or horizontal direction of the imaging device.

Furthermore, according to the present invention, a shift register can output a transfer pulse on a predetermined transfer stage basis, based on the number of pulses contained in a control signal. Thus, by changing the number of pulses of the control signal, any skip mode can be realized. In this case, it is not required to change the scale of a circuit of the shift register depending upon a skip rate.

Furthermore, according to the present invention, by adding a shift register circuit having the same structure as that of a conventional one, a scanning circuit can be obtained, which realizes a read operation at an arbitrary skip rate. Thus, irrespective of a skip rate for conducting a skip mode, a scanning circuit can be obtained using a simple circuit configuration.

According to the present invention, various read modes, such as a block mode (partial cut-out read from an arbitrary portion), a skip mode including interlacing, and a combination thereof (electronic panning, tilting, and zooming), can be conducted.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A scanning circuit for a solid-state imaging device, comprising:

a first shift register divided into a first stage to an N-th stage, each of the first stage to the N-th stage having an input terminal and an output terminal, and the input terminal of the first stage receiving an input signal a first period before a predetermined time;

a switch group divided into a first stage to an N-th stage, each of the first stage to the N-th stage of the switch group having an input terminal and an output terminal, each of the input terminals of the first stage to the N-th stage of the switch group being connected to each of the output terminals of the first stage to the N-th stage of the first shift register, and each of the first stage to the N-th stage of the switch group being conducted between the input terminal and the output terminal of the switch group based on a pulse signal which becomes active at the predetermined time; and a second shift register divided into a first stage to an N-th stage, each of the first stage to the N-th stage having an input terminal and an output terminal, and each of the input terminals of the first stage to the N-th stage of the second shift register being connected to each of the output terminals of the first stage to the N-th stage of the switch group, wherein the output terminal of the first stage of the second shift register outputs a transfer pulse after an elapse of a second period from the predetermined time, and the N is an integer of 2 or more.

2. A scanning circuit for a solid-state imaging device according to claim 1, wherein the output terminals of the first stage to the (N−1)-th stage of the first shift register are connected to the input terminals of the second stage to the N-th stage of the first shift register, and each stage of the output terminals of the first stage to the (N−1)-th stage of the second shift register is connected to the input terminals of the second stage to the N-th stage of the second shift register.

3. A scanning circuit for a solid-state imaging device according to claim 1, wherein each stage of the first shift register has two switches and two inverters, each stage of the switch group has one switch, and each stage of the second shift register has two switches and two inverters.

4. A scanning circuit for a solid-state imaging device, comprising a shift register divided into a first stage to an N-th stage, each of the first stage to the N-th stage receiving a first pulse signal which is cyclic and has a plurality of pulses and a second pulse signal which is cyclic and has a plurality of pulses, the first stage receiving an input signal, and an invalid transfer pulse or an effective transfer pulse being output from the first stage to the N-th stage, wherein whether or not the transfer pulse is effective or invalid is determined based on the first pulse signal and the input signal, and the N is an integer of 2 or more.

5. A scanning circuit for a solid-state imaging device according to claim 4, wherein the output terminals of the first stage to the (N−1)-th stage of the shift register are connected to the input terminals of the second stage to the N-th stage of the shift register.

6. A scanning circuit for a solid-state imaging device according to claim 4, wherein each stage of the shift register has two switches and two inverters.

7. A scanning circuit for a solid-state imaging device, comprising:

a first shift register divided into a first stage to an N-th stage, each of the first stage to the N-th stage having an input terminal and an output terminal, each of the first stage to the N-th stage receiving a first pulse signal which is cyclic except for a vicinity of a predetermined time $t_0$ and has a plurality of pulses and a second pulse signal which is cyclic except for the vicinity of the predetermined time $t_0$ and has a plurality of pulses, and the input terminal of the first stage receiving an input signal a period KT before the predetermined time $t_0$;

a switch group divided into a first stage to an N-th stage, each of the first stage to the N-th stage having an input terminal and an output terminal, the input terminals of the first stage to the N-th stage of the switch group being connected to the output terminals of the first stage to the N-the stage of the first shift register, and each of the first stage to the N-th stage of the switch group being conducted between the input terminal and the output terminal of the switch group based on a pulse signal which becomes active at the predetermined time $t_0$; and a second shift register divided into a first stage to an N-th stage, each of the first stage to the N-th stage having an input terminal and an output terminal, each of the first stage to the N-th stage receiving the first pulse signal and the second pulse signal, and the input terminals of the first stage to the N-th stage of the second shift register being connected to the output terminals of the first stage to the N-th stage of the switch group, wherein the output terminal from an (M·K−(M−1))-th stage to an (M·K−1)-th stage of the second shift register outputs an invalid transfer pulse after an elapse of a period D from the predetermined time $t_0$, and thereafter, the output terminal of an M·K-th stage of the second shift register outputs an effective transfer pulse, the T is a positive number, the M and K are natural numbers, the D is a positive number the N is a natural number of 2 or more, and the M and K satisfy $1 \leq M \cdot K \leq N$.

8. A scanning circuit for a solid-state imaging device according to claim 7, wherein the output terminals of the first stage to the (N−1)-th stage of the first shift register are connected to the input terminals of the second stage to the N-th stage of the first shift register, and the output terminals of the first stage to the (N−1)-th stage of the second shift register are connected to the input terminals of the second stage to the N-th stage of the second shift register.

9. A scanning circuit for a solid-state imaging device according to claim 7, wherein each stage of the first shift register has two switches and two inverters, each stage of the switch group has one switch, and each stage of the second shift register has two switches and two inverters.

* * * * *

UNITED STATES PATENT AND TRADEMARK OFFICE
CERTIFICATE OF CORRECTION

PATENT NO. : 6,285,016 B1
DATED : September 4, 2001
INVENTOR(S) : Takashi Watanabe It is certified that error appears in the above-identified patent and that said Letters Patent is hereby corrected as shown below:

<u>Title page,</u>
Please correct the filing date of the priority document Japanese Patent Application No. 10-262114 to read -- September 16, 1998 --. It now incorrectly reads "September 16, 1988".

Signed and Sealed this

Ninth Day of April, 2002

Attest:

Attesting Officer

JAMES E. ROGAN
Director of the United States Patent and Trademark Office